United States Patent [19]
Bernaerts

[11] 3,862,811
[45] Jan. 28, 1975

[54] STREAMLINED X-Y-Z CONE VALVE

[75] Inventor: Henry J. Bernaerts, Annapolis, Md.

[73] Assignee: The United States of America as represented by the Secretary of the Navy, Washington, D.C.

[22] Filed: Aug. 14, 1973

[21] Appl. No.: 388,287

[52] U.S. Cl. .................................. 416/20, 416/90
[51] Int. Cl. ............................................ B64c 27/18
[58] Field of Search ...................... 416/20, 90, 90 A

[56] References Cited
UNITED STATES PATENTS

| | | | |
|---|---|---|---|
| 1,982,968 | 12/1934 | Stalker | 416/90 X |
| 2,686,567 | 8/1954 | Costa | 416/20 |
| 3,039,537 | 6/1962 | Heidelberg | 416/90 A X |
| 3,209,714 | 10/1965 | Bowles | 416/90 A UX |
| 3,211,397 | 10/1965 | Laing et al. | 416/20 X |
| 3,326,296 | 6/1967 | Hill et al. | 416/90 A X |

FOREIGN PATENTS OR APPLICATIONS

| | | | |
|---|---|---|---|
| 866,580 | 3/1971 | Canada | 416/90 |
| 907,625 | 3/1954 | Germany | 416/20 A |
| 634,332 | 3/1950 | Great Britain | 416/20 A |

Primary Examiner—Everette A. Powell, Jr.
Attorney, Agent, or Firm—R. S. Sciascia; Q. E. Hodges

[57] ABSTRACT

An air valve for a circulation control helicopter rotor. The valve comprises an outer rotating blade-carrying member having an inlet at its bottom and outlets at its periphery, and a conical inner member which directs air from the inlet to the outlets. The axis of the inner member is tiltable toward one of the outlets in order to provide cyclic lift control; its exterior surface is smoothly contoured to reduce flow losses within the hub airflow path. A second embodiment allows pneumatic control of lift control airflow. A third embodiment utilizes a non-circular cone to impose harmonics on the lift control airflow.

5 Claims, 4 Drawing Figures

STREAMLINED X-Y-Z CONE VALVE

The invention described herein may be manufactured and used by or for the Government of the United States for governmental purposes without the payment of any royalties thereon or therefore.

BACKGROUND OF THE INVENTION:

This invention relates to the field of circulation control helicopter rotors such as shown in U.S. Pat. No. 3,713,750. Briefly, a circulation control rotor is one wherein the rotor blades are rigidly fixed to the hub; the cyclic variation in lift for each blade is produced by blowing varying amounts of air or other fluid through slots in the surface of the blade, thereby increasing and decreasing its coefficient of lift by controlling the circulation of air around the blade. A valve in the rotor hub controls the amount of air that is discharged through each rotor blade throughout the 360° of eacy cycle.

The prior art shows circulation control rotors with air valves in the hub, but none of these valves have aerodynamically "clean" flow paths; by contrast, prior art air valves have flow paths that contain sudden expansions, sharp corners, and other sources of losses.

SUMMARY

Briefly, the present invention is a valve for a circulation control rotor hub wherein the member which directs collective and cyclic lift control air to the blades is a streamlined inverted cone, placed with its apex in the air inlet passage. The sides of the cone are smoothly flared in order to direct the air through a 90° turn with minimum losses. The cone is tiltable on its axis toward any side of the hub in order to decrease the amount of air received by blades in that position, thereby providing cyclic lift control.

In a second embodiment, the cone has four channels along its axis for high pressure air; the air from each channel exits from the cone in a series of holes, each series being placed along the axis of the cone and spaced 90° from the adjacent series. When air is blown through one series of holes it induces a greater amount of lift control air flow in that direction, thereby allowing cyclic lift control without moving the cone. The effect is equivalent to fluidic flow control effects used in fluidic valve technology. A third embodiment utilizes a cone with an elliptic cross-section; this imposes harmonics on the cyclic lift control air, since the variation in flow now occurs twice per revolution.

OBJECTS OF THE INVENTION

Accordingly, it is an object of the present invention to provide an air valve for a circulation control rotor having an aerodynamically "clean" flow path.

It is a further object to reduce pressure losses in the airflow of a circulation control rotor to the point where centrifugal forces can pump the air from the hub to the blade opening slots so that automatic pumping and auto-rotation become feasible under most operating conditions.

It is a further object to provide pneumatic control of cyclic lift control air in a circulation control rotor hub valve.

It is a still further object to impose harmonics on cyclic lift control airflow in a circulation control rotor hub valve by suitably contouring the valve.

Other objects and advantages of the present invention will become obvious from the following specification and accompanying drawings.

Figure 1:
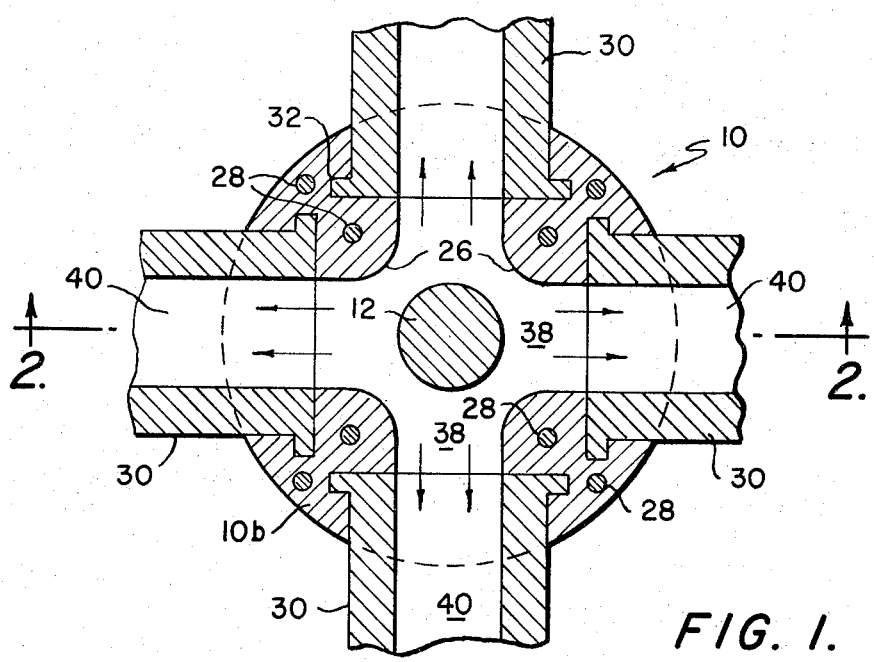
FIG. 1 is a top section view of a circulation control rotor according to the present invention.

DESCRIPTION OF THE PREFERRED EMBODIMENT:

FIG. 1 shows a top section view of a circulation control rotor hub having an air control valve according to the present invention; the hub is comprised of two major assemblies, the outer member 10 which carries the blades and cone 12. Outer member 10 is also comprised of two parts, top 10a and base 10b. While the present example shows a rotor with four blades, it is to be understood that any number of blades may be used.

Figure 2:
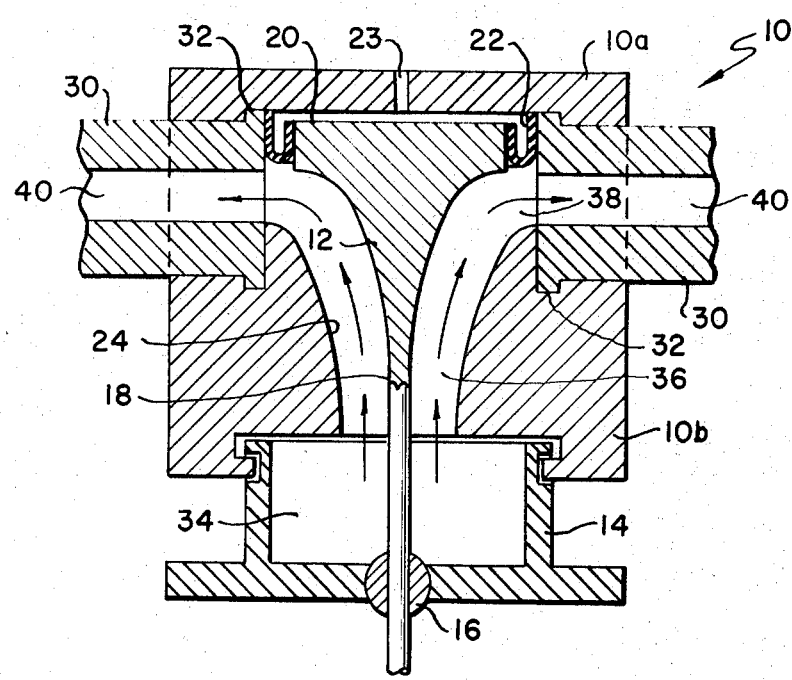
FIG. 2 is taken along line 2—2 of FIG. 1.

FIG. 2 shows the hub in cross-section. Blade carrying outer member 10 is rotatably supported by stationary structure 14, which also supports cone 12 by means of spherical bearing 16. Cone 12 is smoothly flared from its truncated apex 18 to its base 20; the contour of cone 12 is not critical, for example it could be elliptical or parabolic, its only function is to smoothly change the direction of the flow of lift control air by 90°. Base 20 of cone 12 fits within a recess in the top 10a of outer member 10 with rollover seal 22 around the periphery of base 20. Seal 22 can be fixed to either cone 12 or outer member 10 with its other side in sliding contact with the other member; its functions are to reduce air leakage paths between rotor blades and to smooth over the gap between base 20 and outer member 10. Pressure relief hole 23 is provided in top 10a for a purpose to be explained later.

The inner surfaces 24 of outer member 10 have approximately the same contour as cone 12 to provide a smooth airflow path to the blades. When cone 12 is tilted toward one side of the hub, as will be explained later, cone 12 approaches corners 26 and decreases flow into the blade at that point.

Outer member 10 is shown as being made of a base 10b and a top 10a, held together by bolts 28, with blades 30 clamped between; however, any suitable construction may be used as this does not affect the operation of the air valve of the present invention. Likewise, blades 30 are shown as being retained in the hub by flanges 32 although any suitable method of retention can be used.

Operation of the above embodiment is as follows: Air or other lift control fluid enters plenum 34 in support structure 14 and proceeds into passage 36 in base 10b where it is turned 90° by cone 12. When it reaches channels 38 it flows directly into channels 40 of blades 30. With cone 12 centrally disposed in outer member 10 as shown, equal amounts of air will be directed into each blade. Outer member 10 and blades 30 are rotated by means not shown; the amount of lift control air in channels 40 determines the amount of lift developed by each blade, as explained in U.S. Pat. No. 3,713,750. With equal amounts of air in each blade, equal lift will be developed by each blade, and the helicopter will be hovering over a fixed spot (in the absence of any local winds).

When the helicopter is in flight, one of the blades will be advancing and the opposite blade will be retreating, as determined by relative airflow across the blades. The advancing blade requires less cyclic lift control air than the retreating blade to produce the same lift, therefore cone 12 is tilted about spherical bearing 16 toward the advancing blade by actuators not shown. These actuators can be any type of extensible member such as hydraulic cylinders, etc. placed at a right angle to each other perpendicular to the axis of the cone.

Variations in collective lift control air are produced by translating cone 12 axially. When cone 12 is in the position shown in FIG. 2 maximum collective lift control air flows into the blades because channels 38 are at a maximum. If cone 12 is moved down along its axis channels 38 will be decreased in size, hence decreasing the airflow into the blades. Vent holes 23 allows cone 12 to translate freely without building up excessive pressure beneath its base.

Figure 3:
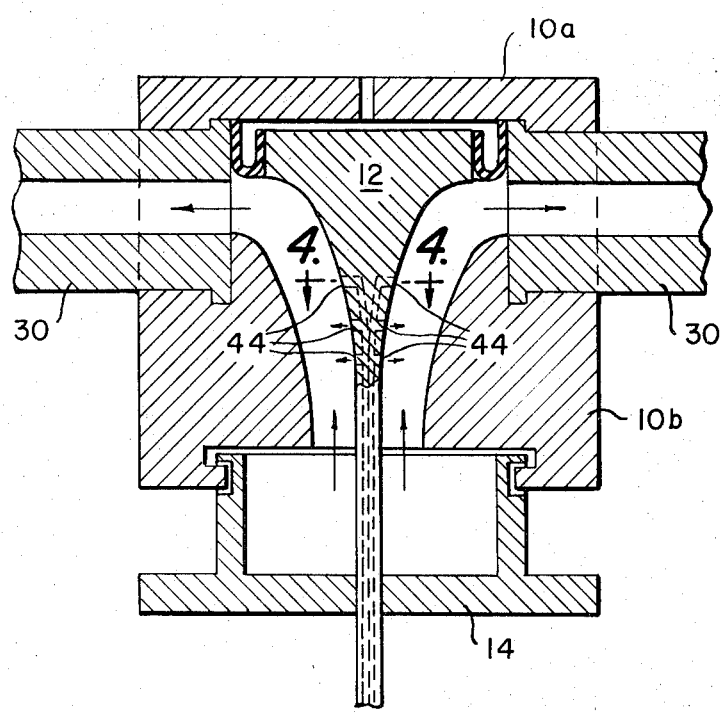
FIG. 3 shows an embodiment having pneumatic or fluidic control of cyclic lift control airflow.
Figure 4:
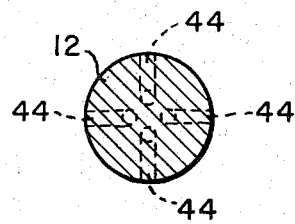
FIG. 4 is taken on line 4—4 of FIG. 3.

A second embodiment of the invention allows changes in cyclic lift control airflow without requiring that cone 12 be tilted. In this embodiment cone 12 has four sets of holes 44 on its surface, each set being along the axis of the cone and displaced 90° from the two adjacent sets as shown in FIGS. 3 and 4. Each set of holes can be fed high pressure air or other fluid through its own supply duct (not shown) in the extended apex of cone 12. When high pressure air is forced through a selected set of holes 44 it induces a greater flow of lift control air into the blade nearest that set of holes, thereby giving pneumatic cyclic lift control. Obviously, in this embodiment spherical bearing 16 and associated actuators can be dispensed with since the direction of flow of the induced airflow can be varied by utilizing two adjcent sets of holes 44. Alternatively, there can be fewer sets of holes 44 with the cone made rotatable about its axis; in this alternative the cone is rotated until a set of holes has the desired azimuthal position, and then high pressure air is blown through these holes to induce flow in that direction.

A third embodiment of the invention utilizes a cone having a cross-section that is elliptical. In this embodiment the blades are rotating about a flattened cone; the airflow to each blade undergoes two cycles per blade revolution, thereby introducing harmonics into the airflow. When the cone is tilted about its axis a change in cyclic lift control will result; the cone must be mounted for rotation about its axis in order to obtain maximum cyclic lift at any point of the cycle (i.e. phase angle control).

In all of the above embodiments the flow losses in the lift control air flow path have been reduced, which produces several benefits. With the rotor turning at its normal operating speed, the centrifugal pumping action of the blades reduces considerably the power needed to circulate lift control air, thereby reducing the overall power needed for operation. If the helicopter loses all power and goes into autorotation, the rotating blades will produce sufficient pumping action to cause flow of enough lift control air to bring the craft to a safe landing.

Obviously many modifications and variations of the present invention are possible in the light of the above teachings. It is therefore to be understood that within the scope of the appended claims the invention may be practiced otherwise than as specifically described.

What is claimed is:

1. A hub for a circulation control rotor comprising:
    an outer member having a plurality of hollow fluid-receiving blades mounted thereon and fluid inlet means perpendicular to said hollow blades;
    means for directing fluid from said inlet to said plurality of hollow blades; and
    fluidic means for biasing fluid flow to a selected one of said plurality of blades.

2. A hub as in claim 1 wherein said means for directing fluid from said inlet to said plurality of hollow blades comprises a flared cone with its apex in said inlet.

3. A hub as in claim 2 including means to rotate said flared cone about its axis.

4. A hub as in claim 3 wherein said fluidic means for biasing fluid flow comprises sets of axially aligned fluid dispensing holes on said flared cone.

5. A hub as in claim 4 wherein said sets of axially aligned fluid dispensing holes are spaced about the circumference of said flared cone.

* * * * *